United States Patent [19]

Detty et al.

[11] Patent Number: 4,584,258

[45] Date of Patent: Apr. 22, 1986

[54] RECORDING AND INFORMATION RECORD ELEMENTS COMPRISING TELLUROPYRLIUM DYES

[75] Inventors: Michael R. Detty; Harold T. Thomas, both of Rochester, N.Y.

[73] Assignee: Eastman Kodak Company, Rochester, N.Y.

[21] Appl. No.: 672,013

[22] Filed: Nov. 16, 1984

[51] Int. Cl.$^4$ .................. G03C 1/00; G01D 15/34
[52] U.S. Cl. .................. 430/270; 430/945; 430/495; 430/17; 430/321
[58] Field of Search .............. 430/945, 495, 270, 17, 430/339, 320, 321; 346/135.1, 76 L

[56] References Cited

U.S. PATENT DOCUMENTS

| | | | |
|---|---|---|---|
| 4,318,112 | 3/1982 | Kivits et al. | 430/945 |
| 4,365,017 | 12/1982 | Detty et al. | 430/83 |
| 4,380,769 | 4/1983 | Thomas et al. | 430/495 |
| 4,415,621 | 11/1983 | Specht et al. | 430/945 |
| 4,446,223 | 5/1984 | Wadsworth et al. | 430/945 |
| 4,499,165 | 2/1985 | Molaire | 430/945 |
| 4,501,808 | 2/1985 | Sakai et al. | 430/945 |
| 4,508,811 | 4/1985 | Gravesteijn et al. | 430/945 |

*Primary Examiner*—Won H. Louie
*Attorney, Agent, or Firm*—John R. Everett

[57] ABSTRACT

Telluropyrylium dyes are useful as infrared absorbing dyes in recording elements.

9 Claims, No Drawings

RECORDING AND INFORMATION RECORD ELEMENTS COMPRISING TELLUROPYRLIUM DYES

FIELD OF THE INVENTION

The present invention relates to optical recording and information elements.

DESCRIPTION RELATIVE TO THE PRIOR ART

Elements for recording information by thermally altering the physical structure of a material are known. One such element comprises a layer of a solvent-coated plastic material coated on a support. The plastic material can be thermally deformed by a laser beam so that some of the plastic material is displaced in the area illuminated by the beam. This deformation pattern retains its shape after the laser beam is removed. The resulting deformation pattern can be read by projecting the pattern onto a viewing screen.

More recently, elements and means have been provided for rapidly recording large amounts of digital information in a small area. These elements provide a method for recording video information which can be read back with a high carrier-to-noise ratio (CNR). These elements employ a thin recording layer of a certain metallic or organic material which is vacuum-deposited on a support. Recording is accomplished by a beam of high-energy density radiation, such as a laser beam. Generally, the laser beam is focused onto the surface of the recording layer of the element. The recording layer is such that it absorbs energy from the laser beam so that small portions of the layer burn, evaporate or are otherwise displaced from these portions. This technique is usually referred to as "ablative recording". Normally, there is continuous motion between the laser and the layer so that, as the laser is pulsed or modulated, discrete pits or holes of varying sizes are created in the layer. The sizes and spacing of these holes constitute the encoded information. One element of this type is commonly referred to in the art as a video disc.

Optical recording discs of the ablative type can be read back using a laser beam similar to the one used to record the element. In conventional ablative video discs, the reading beam must also be significantly absorbed by the recording layer. A continuous reading beam is focused on the recording layer and the difference in optical density between pitted and unpitted areas is detected by a photodetector. The recording layer must absorb significantly less energy from the reading beam than it absorbs from the writing beam if physical damage to the recording is to be avoided. This is usually accomplished by using a reading beam of much lesser power than the writing beam.

In Research Disclosure, Vol. 194, Item 19412, June 1980, published by Kenneth Mason Publications, Ltd., The Old Harbourmaster's, 8 North Street, Emsworth, Hampshire P010 7DD, England, an element is disclosed for recording information by thermal deformation. The recording element comprises a support and a layer of a radiant energy-absorptive dye in a thermally deformable binder. Upon exposure to a pulsed beam of high intensity radiant energy, deformations comprising a depression surrounded by a ridge are formed, thus allowing recording with a modulated beam and playback by reflection and/or refraction. Laser beam recording upon such an element has heretofore been accomplished with an argon-ion laser which emits at 488 nm. A pulsed beam is obtained from the continuous argon-ion laser beam by modulating the beam with an acousto-optic or electro-optic modulator. Those modulators have low efficiency and the system thus requires a high-power laser.

Currently, however, there are diode lasers available which are more suitable for home-use because their output can be modulated directly. These can function as effectively as much more powerful continuous gas lasers for optical recording and readback. They need no expensive acousto-optic or electro-optic modulators and are becoming available at greatly reduced prices. The earlier constructed diode lasers emitted at about 800–900 nm and newer models emit between 750–850 nm. There is a need for soluble, solvent-coatable materials absorbing between 750–900 nm, preferably 750–850 nm, which are suitable for use in recording elements of the type described in Research Disclosure, Vol. 175, Item 17522, November 1978, designed for recording and playback with a low-power diode laser.

SUMMARY OF THE INVENTION

The present invention provides optical recording and information bearing record elements comprising a support having coated thereon an optical recording layer of an amorphous composition comprising a binder and a dye characterized in that the dye is an infrared absorbing telluropyrylium material. Telluropyrylium includes benzotelluropyrylium. By infrared absorbing we mean the dyes absorb in the 700–900 nm range of the spectrum. The recording elements comprising such dyes are useful in optical recording methods employing diode recording and readback laser devices. None of the telluropyrylium dyes disclosed for use herein have been previously identified as having infrared absorbing capabilities.

The present invention also provides a method of making a recording element comprising the steps:
1. applying to a support a coating composition comprising a radiation absorptive dye and a compatible binder and
2. drying the composition to form an amorphous layer; characterized in that the dye is an infrared absorbing telluropyrylium dye.

DESCRIPTION OF THE PREFERRED EMBODIMENTS

Preferred recording and information record elements comprise recording layers which absorb in the 700–900 nm region of the spectrum. The layers comprise a telluropyrylium dye of the structures:

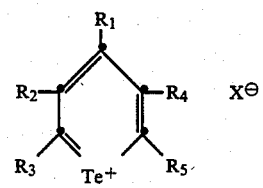

I.

wherein
$R_1$, $R_3$ and $R_5$ each independently represents alkyl, aryl, $(CR_6=CH)_nCR_7=A_1$ or $(CH=CH)_mA_2$ provided that one, and only one, of $R_1$, $R_3$ and $R_5$ is $(CR_6=CH)_nCR_7=A_1$ or $(CH=CH)_mA_2$;

$R_2$ and $R_4$ each independently represents hydrogen; or $R_2$ and $R_3$, or $R_4$ and $R_5$, taken together with the carbon atoms to which they are attached, form a mononuclear or polynuclear fused carbocyclic ring having from about 5 to 20 carbon atoms;

$R_6$ and $R_7$ are each independently hydrogen, cyano, alkyl or aryl;

$A_1$ represents a monocyclic or polycyclic heterocyclylidene group such as oxazolylidene, thiazolylidene, selenazolylidene, imidazolylidene, pyranylidene, thiapyranylidene, selenapyranylidene, telluropyranylidene, oxoindolazinylidene, benzoxazolylidene, benzothiazolylidene, benzopyranylidene, benzothiapyranylidene, benzoselenapyranylidene, or benzotelluropyranylidene;

$A_2$ represents aryl, amino, dialkylaminoaryl, alkylamino, arylamino, dialkylamino, diarylamino or a monocyclic or polycyclic heterocyclyl group such as oxazolyl, tetrahydroquinolinyl, 9-julolidyl, thiazolyl, selenazolyl, imidazolyl, benzoxazolyl, benzothiazolyl, or naphthyl;

n represents a number from 0 to 5;

m represents a number from 1 to 5; and

X represents an anion such as $BF_4^-$, $ClO_4^-$, $CF_3SO_3^-$, $FSO_3^-$, $PF_6^-$, $CH_3SO_3^-$, $Cl^-$, $Br^-$, or $I^-$.

These preferred telluropyrylium materials include infrared absorbing benzotelluropyrylium materials when either $R_2$ and $R_3$ or $R_4$ and $R_5$, taken together with carbon atoms to which they are attached, form a polynuclear fused carbocyclic ring having 6 carbon atoms. They have the structure:

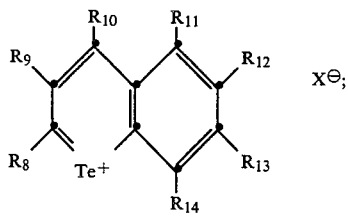

II.

$R_{10}$ and $R_8$ each independently represents alkyl, aryl, $(CR_6=CH)_nCR_7=A_1$, or $(CH=CH)_mA_2$ provided that one, and only one, of $R_8$ and $R_{10}$ is $(CR_6=CH)_nCR_7=A_1$ or $(CH=CH)_mA_2$;

$A_1$ and $A_2$ are as previously defined;

$R_6$ and $R_7$ are each independently hydrogen, cyano, alkyl, or aryl;

$R_9$, $R_{11}$, $R_{12}$, $R_{13}$ and $R_{14}$ each independently represents hydrogen;

n represents a number from 0 to 5;

m represents a number from 1 to 5; and

X represents an anion as previously defined.

"Alkyl" includes a branched- or straight-chain hydrocarbon having up to 16 carbon atoms, such as methyl, butyl, dodecyl, nonyl, tertiary-butyl and isobutyl; "aryl" includes phenyl, naphthyl, anthryl, alkoxyphenyl and dialkylaminophenyl.

DETAILED DESCRIPTION OF THE INVENTION

The telluropyrylium dyes which are useful in the recording and information bearing elements of this invention can be made according to methods described in U.S. Pat. No. 4,365,017 granted Dec. 21, 1982 in the name of Detty et al. Examples of useful telluropyrylium dyes are presented in Table I.

TABLE I

Telluropyrylium Dyes for Laser Write- and Read-Application

| Dye No. | Structure | mp, °C. | CH$_2$Cl$_2$ λ-max, nm | log ε |
|---|---|---|---|---|
| 1. | NMe$_2$ ... BF$_4^-$ ... Ph—Te$^+$—Ph | 248–250 | 790 | 4.97 |
| 2. | Me, Me, N ... CF$_3$SO$_3^-$ ... Ph—Te$^+$—Ph | foam | 795 | 5.08 |
| 3. | N ... BF$_4^-$ ... Ph—Te$^+$—Ph | 172 | 818 745 | 5.02 4.88 |

TABLE I-continued

Telluropyrylium Dyes for Laser Write- and Read-Application

| Dye No. | Structure | mp, °C. | CH₂Cl₂ λ-max, nm | log ε |
|---|---|---|---|---|
| 4. | 4-NMe₂-C₆H₄-(CH=CH)₂- telluropyrylium (2,6-diphenyl), BF₄⁻ | 149-152 | 870 | 5.19 |
| 5. | 2,6-di-tert-butyl-4-[(2,6-di-tert-butyl-4H-telluropyran-4-ylidene)methyl]telluropyrylium, BF₄⁻ | 239-240 | 715 | 5.11 |
| 6. | 2,6-di-tert-butyl-4-[3-(2,6-di-tert-butyl-4H-telluropyran-4-ylidene)-1-propenyl]telluropyrylium, BF₄⁻ | 205-208 | 830 | 5.52 |
| 7. | 2,6-di-tert-butyl-4-[3-(2,6-di-tert-butyl-4H-selenopyran-4-ylidene)-1-propenyl]telluropyrylium, BF₄⁻ | 199-202 | 786 | 5.45 |
| 8. | 2,6-di-tert-butyl-4-[3-(2,6-di-tert-butyl-4H-selenopyran-4-ylidene)-2-methyl-1-propenyl]telluropyrylium, BF₄⁻ | 214.5-215 | 800 | 5.46 |
| 9. | 2,6-di-tert-butyl-4-[3-(2,6-di-tert-butyl-4H-selenopyran-4-ylidene)-1-methyl-1-propenyl]telluropyrylium, ClO₄⁻ | 191-195 | 803 | 5.44 |

TABLE I-continued

Telluropyrylium Dyes for Laser Write- and Read-Application

| Dye No. | mp, °C. | CH₂Cl₂ λ-max, nm | log ε |
|---|---|---|---|
| 10. [structure: (CH₃)₃C, Te, C(CH₃)₃ top ring; CCH₃ bridge; CH=CH; bottom Te⁺ ring with (CH₃)₃C groups; BF₄⁻] | 200–202 | 843 | 5.42 |
| 11. [structure: (CH₃)₃C, Te, C(CH₃)₃ top ring; CCN bridge; CH=CH; bottom Te⁺ ring with (CH₃)₃C groups; BF₄⁻] | 141–143 | 792 | 5.41 |
| 12. [structure: julolidine-type N tricyclic system; CH=CH; telluropyrylium ring with (CH₃)₃C and C(CH₃)₃; BF₄⁻] | 178–179 | 775 / 710 | 5.16 / 4.08 |
| 13. [structure: (CH₃)₃C, Te, OCH₃ naphthyl top; CH=CH bridge; bottom ring (CH₃)₃C–Te⁺–OCH₃ naphthyl; BF₄⁻] | 238–240 (dec) | 870 | 5.18 |
| 14. [structure: NMe₂-phenyl; CH=CH; telluropyrylium with (CH₃)₃C and OCH₃; BF₄⁻] | 213 (dec) | 748 | 5.11 |
| 15. [structure: NMe₂-phenyl; (CH=CH)₂; telluropyrylium with (CH₃)₃C and OCH₃; BF₄⁻] | 212 (dec) | 855 | 5.16 |

TABLE I-continued

Telluropyrylium Dyes for Laser Write- and Read-Application

| Dye No. | mp, °C. | CH₂Cl₂ λ-max, nm | log ε |
|---|---|---|---|
| 16. 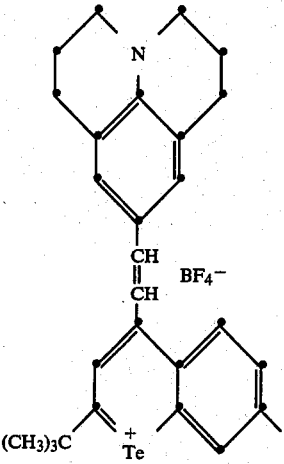 | 131 (dec) | 784 | 5.03 |
| 17. | 181–183 | 803 740 | 4.93 4.83 |
| 18. | 139–144 | 790 | 4.87 |
| 19. | 120–126 | 786 | 5.12 |
| 20. 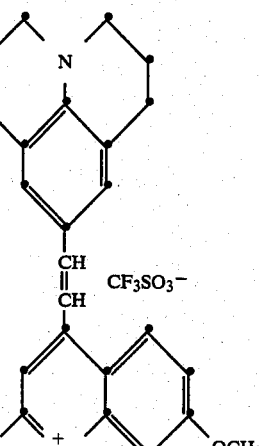 | | | |
| 21. 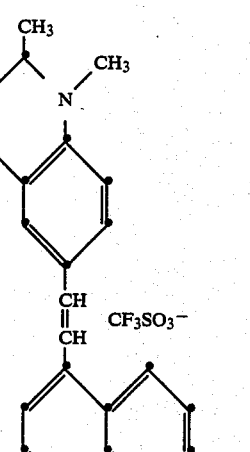 | | | |

The described dyes are compatible with binders which are useful in making laser recording elements. By "compatible" is meant that the dye can be mixed with the binder in sufficient concentration to provide a high enough absorption factor to form pits without crystallizing after a layer of the dye and binder is coated and dry. That is, the layers are amorphous. Generally, the described dyes are compatible in dye-binder compositions comprising at least 50 percent dye by weight, although higher concentrations and therefore higher absorption factors are possible. Because of the high extinction coefficient of many of the present dyes at wavelengths from 700–900 nm and their excellent compatibility with common binders, these dyes can be included in the composition over a very wide range of concentration while maintaining the necessary absorption characteristics.

Useful binders are, for example, cellulose acetate butyrates, cellulose nitrate, polystyrenes, polysulfonamides, polycarbonates, cellulose nitrate, hydroabietyl alcohol (sold by the Hercules Chemical Co. as Abitol TM AUK 257), poly(ethyl methacrylate), poly(vinyl butyral) and combinations and derivatives thereof. The preferred binder is an amorphous material comprising a mixture of non-polymeric compounds. The mixture is (a) amorphous, (b) solid at about 20° C., and (c) comprises at least two different compounds each having at least two linking components joining one multivalent organic nucleus with at least two organic nuclei wherein at least one of the multivalent organic nuclei is a multicyclic or aromatic nucleus. Examples of such binders are presented in Table II.

TABLE II-continued

| | Mole % |
|---|---|
| 3. [structure with CHN-phenyl-C(CH3)2-CH2-C(CH3)2-phenyl-NHC(O)- linkage] | |
| Cl-phenyl | 16.67% |
| OH-naphthyl | 50% |
| Cl-phenyl | 16.67% ; |
| Br-phenyl | 16.67% |
| 4. [structure with Cl,Cl-phenyl-C(fluorene)-phenyl-Cl,Cl diester, 61 Mole %] | |
| naphthyl | 35% |
| phenyl-NO$_2$ | 30% ; |
| phenyl-Cl | 35% |
| [structure with Cl,Cl-phenyl-C(norbornyl)-phenyl-Cl,Cl diester, 39 Mole %] | |

Such binders are the subject of U.S. patent application Ser. No. 473,825, now U.S. Pat. No. 4,499,165, granted Feb. 12, 1985 to Molaire. filed Mar. 9, 1983, entitled. The latter application is expressly incorporated herein by reference.

A useful laser recording element comprises a support having coated thereon a layer of the dye and the binder. Depending upon the desired mode of reading the element, the support is either reflective or transparent. In the case of a reflective support, both sides of the support can be reflective and a recording layer can be provided on both sides. The support can be any of a wide variety of materials including glass, a self-supporting polymer film such as poly(ethylene terephthalate) or cellulose acetate, or metal. The support must have a relatively high melting point in order to avoid deformation of the support during recording. The support is desirably very smooth to minimize noise and dropouts. In certain preferred embodiments, the support is coated with a smoothing layer prior to the coating of the reflective surface and the described dye-binder composition.

The composition which is used as a smoothing layer is preferably a low-viscosity, polymerizable fluid which can be coated on the surface of the support. Following coating, polymerization of the fluid produces a microsmooth surface on the support. The support can be made reflective by vacuum metalization of the smooth surface. In preferred embodiments, the polymerizable fluid comprises photopolymerizable monomers. Preferably, the monomers or mixtures of monomers are low-viscosity fluids in the absence of a solvent. Useful polymerizable fluid compositions are described in U.S. Pat. Nos. 4,092,173 and 4,171,979.

The recording layer comprising the described dye and binder is coated by a wide variety of methods. Most conveniently, the dye and binder are coated from a common solvent or, alternatively, from a mixture of miscible solvents. The dye-binder composition can be coated by spray coating, airknife coating, whirl coating or by any other suitable method. The thickness of the recording layer according to the present invention is not critical; however, best results are obtained when the thickness of the layer is between about 0.1 and about 10 microns.

The described recording compositions having an absorption factor of at least 20 are capable of producing depressions or holes surrounded by sharply defined ridges. This type of deformation can be read back using a read beam which is not significantly absorbed by the recording layer. By "sharply defined ridge" is meant that the ridge and hole/depression have noticeable boundaries and that, as measured in the plane of the undeformed outer surface of the plane of the undeformed outer surface of the layer, the width of the ridge is less than or equal to the breadth of the hole depression. These dimensions can be measured with an electron micrograph.

The thickness, absorption factor and index of refraction of the recording compositions of the present invention can be optimized by a method which is described in Research Disclosure, Item 20635, Vol. 206, June 1981.

The following examples are presented.

EXAMPLES 1-6

Table I dyes 6, 7, 8, 11, 20 and 21 were evaluated for utility in optical recording elements with a static pit tester.

The static pit tester provides automated facilities for exposing standard test patterns on 2" by 2" glass slides or film samples with a laser. A microcomputer using FORTH language was used to control the sample position and the laser power.

Six different coating compositions were prepared by mixing 0.03 gm dye, 0.03 gm of the binder (Compound 3, Table III) in 0.2 ml of 1,2,3-trichloropropane, 2.0 ml of bromobenzene, 3 drops of a fluorinated surfactant (1% solution in bromobenzene).

Fourteen different coating compositions were prepared on glass slides or films by dip coating.

Each coating was then exposed, in the static pit tester, to a power series array of ten pits on 4 micron centers at each of six power levels (2, 3, 4, 6, 8 and 10 milliwatts) on the sample, with a 50 nanosecond pulse duration from an 830 nanometer diode laser. This pattern was repeated at 2 mm intervals across the sample for a total of thirteen test patches. These test patches were examined with a Nomarsky differential interference contrast microscope to determine the presence or absence of pits in a particular coating. A dye is considered useful when a pit is formed at any of the six power levels at any position of the coating.

Pits were formed in each of the six coated compositions.

EXAMPLES 7-8

Recording elements were prepared with Table I dyes 6 and 18. The results of this example confirm the effectiveness of the static pit test in evaluating dyes for utility in optical recording elements.

Two different recording elements were prepared as follows:

270-mm-diameter circular glass substrates were whirl-coated with a surface-smoothing composition by flooding the glass substrates with the smoothing composition at low rpm (about 80-100 rpm) and then leveling the coatings by advancing the speed to about 500 rpm. The surface-smoothing composition comprised:

| | |
|---|---|
| pentaerythritol tetraacrylate | 20 g |
| a low-viscosity urethane-acrylate monomer (UV-curable Topcoat 874-C-2002 ®, Fuller O'Brien Corp.) | 20 g |
| 2-ethoxyethanol | 60 g |
| a coumarin sensitizer composition | 3 g |
| surfactant | 3 drops |

The coated and dried surface-smoothing composition was cured by irradiating with a 3000-watt pulsed xenon arc lamp at 45.72 mm for 4 minutes.

The thus smoothed surface of the substrates were then coated with a 0.05 μm thick reflecting layer of aluminum by vapor deposition.

Two different recording layers were whirl-coated on the reflecting layers by flooding the reflecting layers with dye-binder-solvent coating solutions and then leveling the coatings at about 500 rpm for coatings 1 and 2. The composition of each coating solution is given in Table III.

TABLE III

| Element | Table I Dye No. | Binder | Solvent | Weight Ratio of Dye/Binder/Solvent | Coating rpm |
|---|---|---|---|---|---|
| 1 | 6 | Binder 1, Table II | bromobenzene | 1/4/245 | 500 |
| 2 | 18 | cellulose nitrate | cyclohexanone | 1/1/100 | 505 |

After drying, tracks were recorded in the recording layers of each element using a diode laser-light emitting at about 810 nm and focused with a numerical aperture NAg=0.525 while the elements were rotating at 1800 rpm. The term "NAg" represents the numerical aperture of the focused gaussian beam of light measured to its $e^{-2}$ irradiance diameter. The recorded tracks were read back with the same laser. The 50% Institute of Radio Engineers flat field video signal-to-noise ratios were determined. Results are presented in Table IV.

TABLE IV

| Example No. | Element | Table I Dye No. | Disc Rotational Speed (cps) | 1/1 Dye/Binder Absorption Factor | Recording Power at the Disc (mw) | Signal-To-Noise Ratio Readout (db) |
| --- | --- | --- | --- | --- | --- | --- |
| 7 | 1 | 6 | 30 | 50 | 16 | 55 |
| 8 | 2 | 18 | 30 | 42 | 12 | 51 |

The invention has been described in detail with particular reference to preferred embodiments thereof, but it will be understood that variations and modifications can be effected within the spirit and scope of the invention.

What is claimed is:

1. A recording element comprising a support having coated thereon an optical recording layer of an amorphous composition comprising an infrared absorbing telluropyrylium dye and a binder; wherein the dye is present in the layer in an amount of at least 50% by weight of the dye and binder.

2. The element of claim 1 wherein the layer absorbs in the 700-900 nm region of the spectrum and the dye has the structure

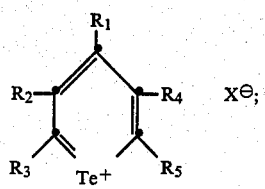

wherein $R_1$, $R_3$ and $R_5$ each independently represents alkyl, aryl, $(CR_6=CH)_nCR_7=A_1$ or $(CH=CH)_mA_2$ provided that one, and only one, of $R_1$, $R_3$ and $R_5$ is $(CR_6=CH)_nCR_7=A_1$ or $(CH=CH)_mA_2$; wherein $R_2$ and $R_4$ each independently represents hydrogen; or $R_2$ and $R_3$, or $R_4$ and $R_5$, taken together with the carbon atoms to which they are attached, form a mononuclear or polynuclear fused carbocyclic ring having from about 5 to 20 carbon atoms; $R_6$ and $R_7$ are each independently hydrogen, cyano, alkyl or aryl;

$A_1$ represents a monocyclic or polycyclic heterocyclylidene group;

$A_2$ represents aryl, amino, dialkylaminoaryl, alkylamino, arylamino, dialkylamino, diarylamino or a monocyclic or polycyclic heterocyclyl group;

n represents a number from 0 to 5;

m represents a number from 1 to 5; and

X represents an anion.

3. The element of claim 2 wherein the dye has the structure

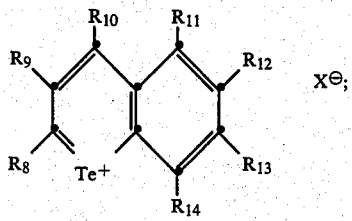

wherein $R_{10}$ and $R_8$ each independently represents alkyl, aryl, $(CR_6=CH)_nCR_7=A_1$ or $(CH=CH)_mA_2$ provided that one, and only one, of $R_{10}$ and $R_8$ is $(CR_6=CH)_nCR_7=A_1$ or $(CH=CH)_mA_2$;

$A_1$ represents a monocyclic or polycyclic heterocyclyidene group;

$A_2$ represents aryl, amino, dialkylaminoaryl, alkylamino, arylamino, dialkylamino, diarylamino or a monocyclic or polycyclic heterocyclyl group;

$R_6$ and $R_7$ are each independently hydrogen, cyano, alkyl or aryl;

$R_9$, $R_{11}$, $R_{12}$, $R_{13}$ and $R_{14}$ each independently represents hydrogen;

n represents a number from 0 to 5;

m represents a number from 1 to 5; and

X represents an anion.

4. The element of claim 2 wherein $R_1$, $R_3$ and $R_5$ each independently represents methyl, ethyl, t-butyl, phenyl, p-N,N-dimethylaminophenyl, p-anisyl and $(CR_6=CH)_nCR_7-A_1$, $(CH=CH)_mA_2$;

$A_1$ represents a nucleus selected from the group consisting of oxazolylidene, thiazolylidene, selenazolylidene, imidazolylidene, pyranylidene, thiapyranylidene, selenapyranylidene, telluropyranylidene, oxoindolazinylidene, benzoxazolylidene, benzothiazolylidene, benzopyranylidene, benzothiapyranylidene, benzoselenapyranylidene, or benzotelluropyranylidene;

$A_2$ represents phenyl, dimethylaminophenyl, dimethylamino or a nucleus selected from the group consisting of oxazolyl, 9-julolidyl, thiazolyl, selenazolyl, tetrahydroquinolinyl, imidazolyl, benzoxazolyl, benzothiazolyl or naphthyl; and X represents $BF_4^-$, $ClO_4^-$, $CF_3SO_3^-$, $FSO_3^-$, $PF_6^-$, $CH_3SO_3^-$, $Cl^-$, $Br^-$, or $I^-$.

5. The element of claim 3 wherein $R_8$ and $R_{10}$ each independently represents methyl, ethyl, t-butyl, phenyl, p-anisyl, 2,5-dimethoxyphenyl, p-N,N-dimethylaminophenyl and $(CR_6=CH)_nCR_7=A_1$ or $(CH=CH)_mA_2$;

$A_1$ represents a nucleus selected from the group consisting of oxazolylidene, thiazolylidene, selenazolylidene, imidazolylidene, pyranylidene, thiapyranylidene, selenapyranylidene, telluropyranylidene, oxoindolazinylidene, benzoxazolylidene, benzothiazolylidene, benzopyranylidene, benzothiapyranylidene, benzoselenapyranylidene, or benzotelluropyranylidene;

$A_2$ represents phenyl, dimethylaminophenyl, dimethylamino or a nuclus selected from the group consisting of oxazolyl, 9-julolidyl, thiazolyl, selenazolyl, tetrahydroquinolinyl, imidazolyl, benzoxazolyl, benzothiazolyl or naphthyl; and X represents $BF_4^-$, $ClO_4^-$, $CF_3SO_3^-$, $FSO_3^-$, $PF_6^-$, $CH_3SO_3^-$, $Cl^-$, $Br^-$, or $I^-$.

6. The element of claim 1 wherein the dye is selected from the group consisting of

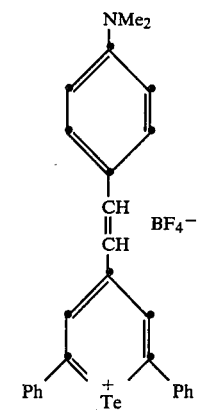
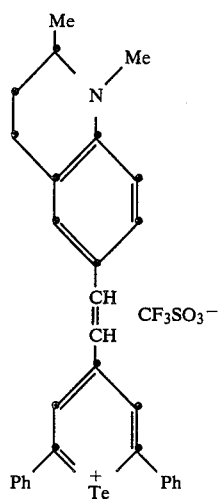
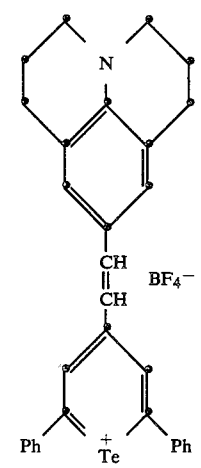
-continued
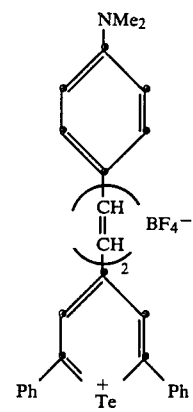
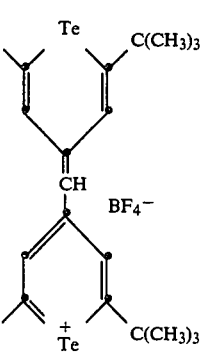
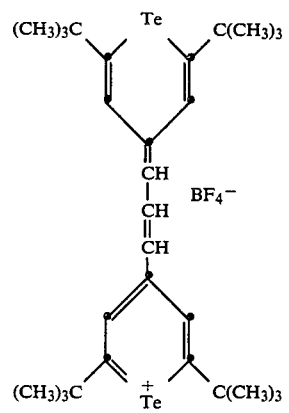
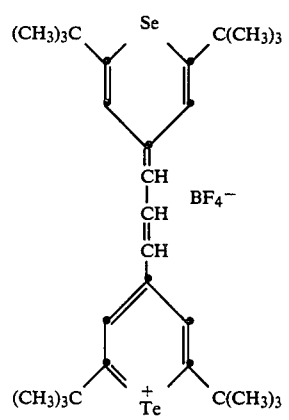

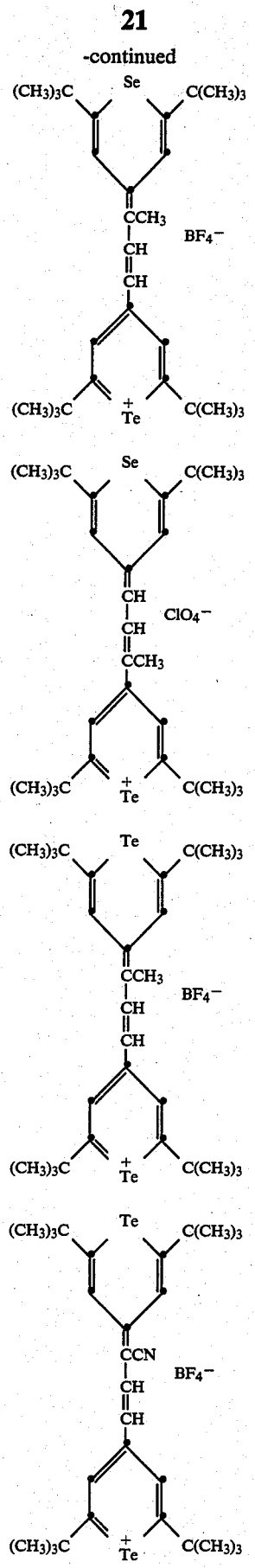
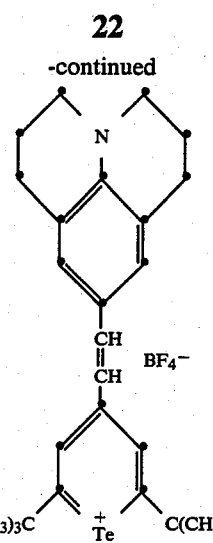
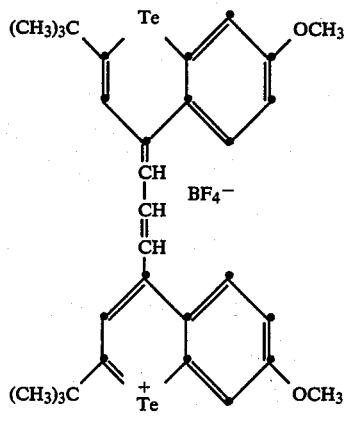
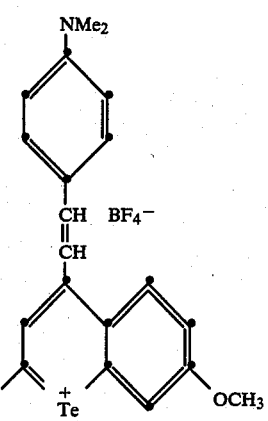
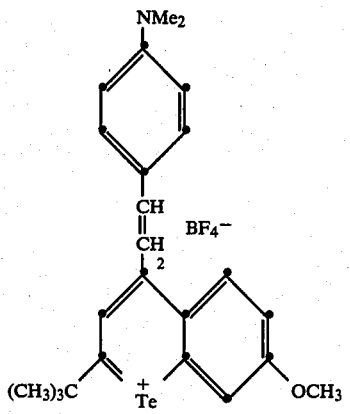

-continued
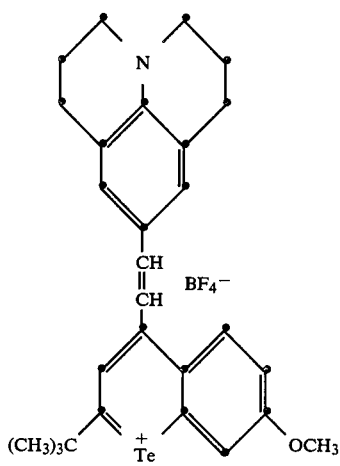
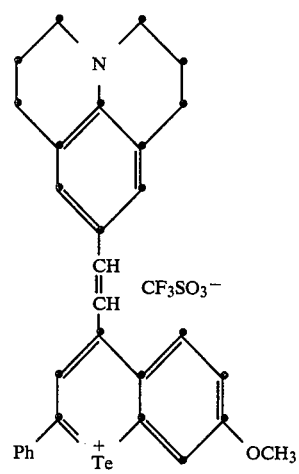
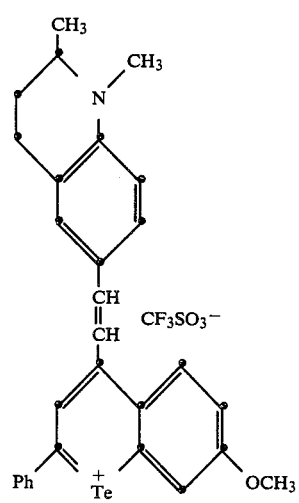
-continued
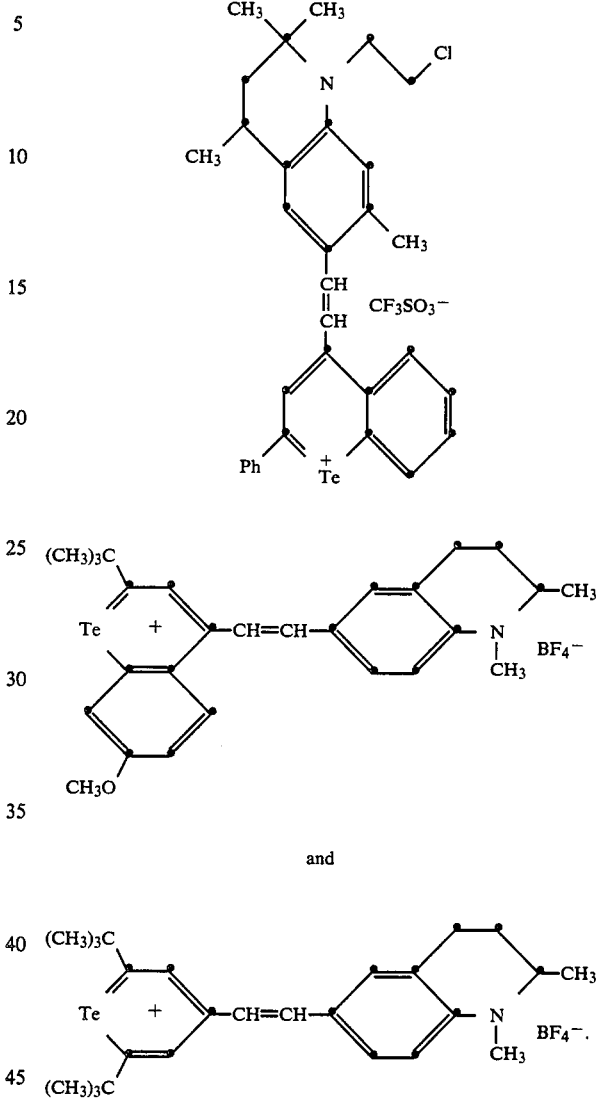
and
7. The element of claim 1 wherein the optical recording layer has an absorption factor of at least 20.
8. The recording element of claim 1 wherein the support is reflecting.
9. The recording element of claim 1 wherein the binder is selected from the group consisting of

|  | Mole % |
|---|---|
| 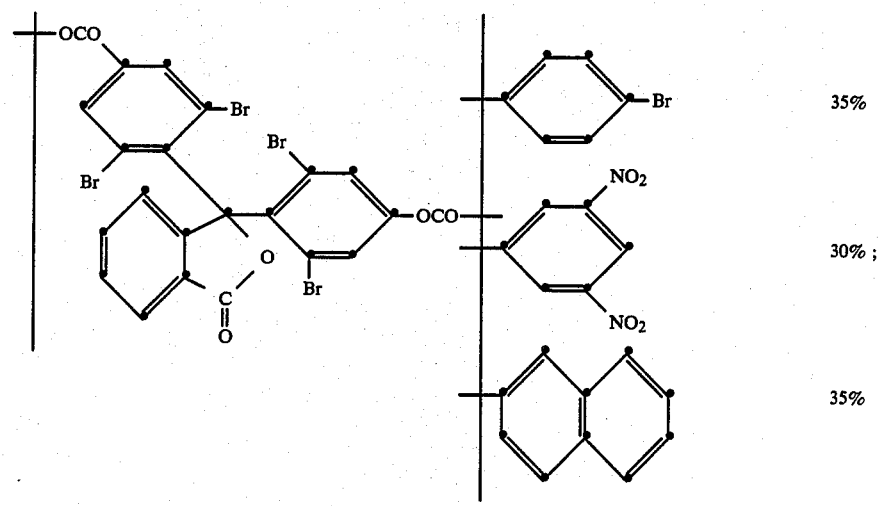 | 35% 30%; 35% |
| 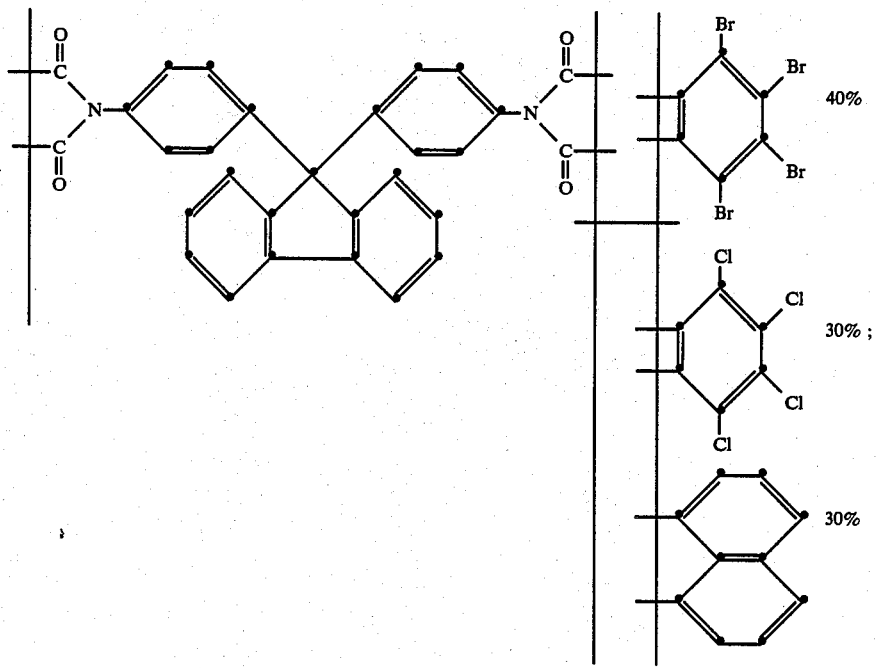 | 40% 30%; 30% |

-continued
| | Mole % |
|---|---|
| 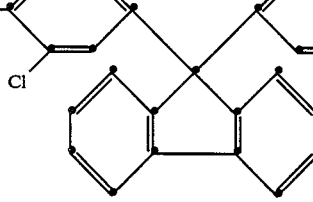 | 16.67%<br><br>50%<br><br>16.67% ;<br><br>16.67% |
and
| 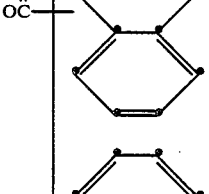 | 35%<br><br>30% .<br><br>35% |
|---|---|
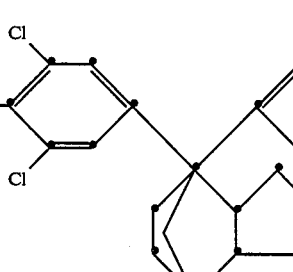
* * * * *